United States Patent [19]

Geyer

[11] Patent Number: 4,944,597

[45] Date of Patent: Jul. 31, 1990

[54] EXTRUSION APPARATUS

[76] Inventor: Paul Geyer, 15660 Tacoma, Detroit, Mich. 48025

[21] Appl. No.: 347,092

[22] Filed: May 4, 1989

[51] Int. Cl.⁵ ................................................. B29B 1/06
[52] U.S. Cl. ....................................... 366/79; 366/322
[58] Field of Search ...................... 366/79, 80, 81, 82, 366/88, 89, 90, 319, 322; 425/208, 207, 209

[56] References Cited

U.S. PATENT DOCUMENTS

| | | | |
|---|---|---|---|
| 2,200,997 | 5/1940 | Royle | 366/80 |
| 2,744,287 | 5/1956 | Parshall | 366/300 |
| 3,150,411 | 9/1964 | Daubenfeld | 366/80 |
| 3,375,549 | 4/1968 | Geyer | 366/83 |
| 4,075,712 | 2/1978 | Geyer | 366/80 |

Primary Examiner—Robert W. Jenkins
Attorney, Agent, or Firm—Dykema Gossett

[57] ABSTRACT

An extruder, including a rotor and a barrel having a mixing or working section therein, in which all of the material being worked is in barrel grooves and is moved only in a circumferential direction by a smooth cylindrical rotor. The barrel groove consists of wide tapering in depth area, which starts deep and progressively decreases in depth to the downstream end where the depth is restrictive to oversize and viscous material. Well worked material passing the barrier is separated from and directed downstream, thus providing fast forward flow of the fluent phase material, minimizing the rework of already worked material and exposing the less worked material to extruder action. The tapering depth area coacting with the smooth rotor generates progressively high pressure, and an increasing shear rate along its length and thereby provides the ideal conditions for dispersing powdered chemicals into the polymer. All of the material being worked uniformly, need for dwell time is eliminated, extruder length can be such that the input work is only equal to the heat required to raise the material to temperature or adiabatic operation. Thus a short high speed inexpensive extrusion apparatus is provided which produces a superior pulseless extrusion.

7 Claims, 4 Drawing Sheets

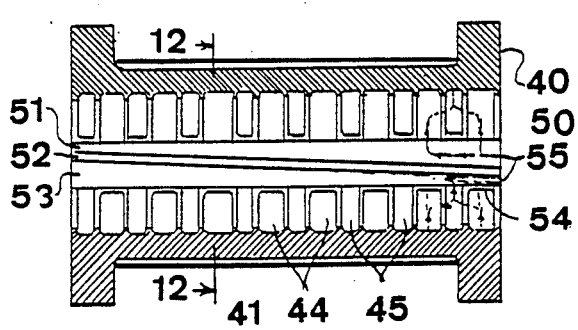
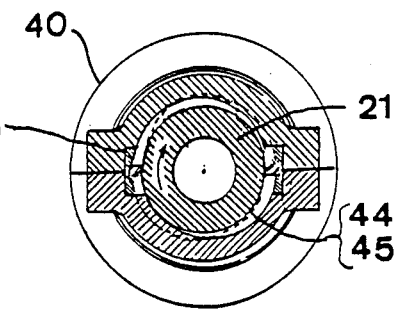
FIG.11  FIG.12
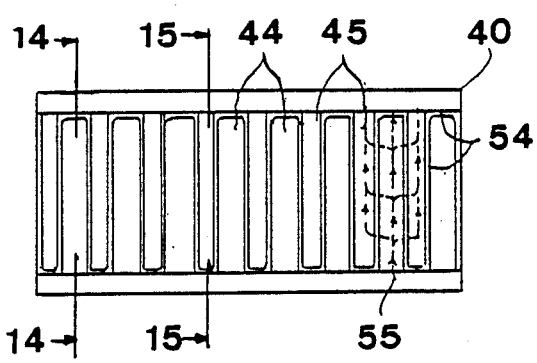
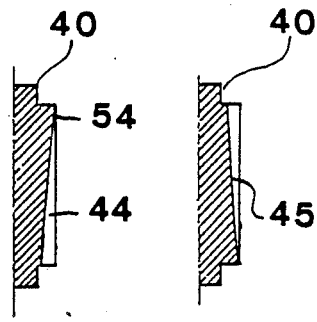
FIG.13  FIG.14  FIG.15
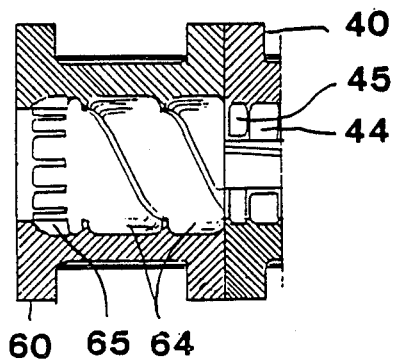
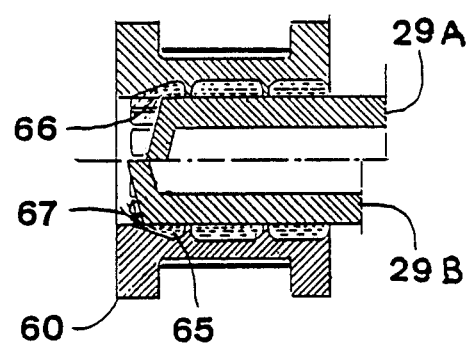
FIG.16  FIG.17
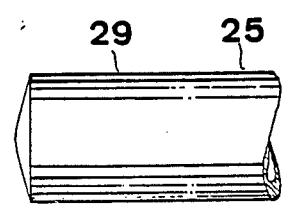
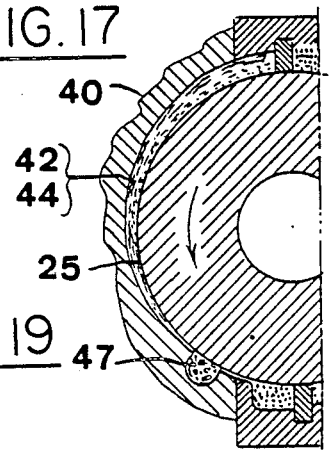
FIG.18  FIG.19

EXTRUSION APPARATUS

This invention relates to an extrusion apparatus, and particularly to an apparatus of the rotor and barrel type for refining and extruding thermoplastic and rubber like materials.

BACKGROUND OF THE INVENTION

The first helical groove rotor in a barrel bore apparatus was probably used to grind meat, long before rubber was invented. The meat grinding operation wedges the material against the barrel bore so as to cause the helical groove to move the material longitudinally downstream.

The extrusion flow of the modern rubber extruder, however is quite different. Adhesion to the barrel surface and resistance to forward flow causes the rubber contacting the barrel to be moved circumferentially across the helical groove, from the leading edge to the trailing edge. Material arriving at the trailing edge is forced downward and follows the path of least resistance back to the leading edge of the helical groove. This flow pattern concentrates the mechanical shear to the material at the barrel and groove surfaces and thereby generates temperature stratified material consisting of warm material surrounding a cold core. My U.S. Pat. Nos. 2,744,287, 3,375,549 and 4,075,712 are designed to and do correct the temperature stratification, to a reasonable blend of worked and overworked process material. The present invention is therefore aimed at a mixing labyrinth which does not develop temperature stratification by the simple means of moving the warmed material downstream quickly and to thereby minimize the rework of already worked material.

SUMMARY OF THE INVENTION

It is therefore a feature of the present invention to provide an improved apparatus which advances the fluent phase material and thereby exposes the less fluent phase material to additional work.

Another feature is to provide an improved apparatus which performs the extrusion operation with less input work by minimizing the rework of already worked material.

Still another feature is to provide an improved apparatus which by minimizing work input decreases degradation of the polymer of the process material.

A further feature is to provide an improved apparatus which develops dissimilar rates of flow of the process material to thereby develop extrusion blending.

A still further feature is to provide an improved apparatus which uniformly intensively shears all of the process material through a restrictive opening and leads the sheared material downstream.

Another feature is to provide an improved apparatus which provides a restrictive barrier which retards the flow of over size material and exposes it to additional shearing.

Still another feature is to provide an improved apparatus an extrusion groove which does not form the extrusion material into a cold core surrounded by warmed material, as developed by the usual helical extrusion groove.

A further feature is to provide an improved apparatus which develops intensive local extrusion pressure on the process material tending to develop micro dispersion of the additives into the polymer.

A still further feature is to provide an improved apparatus which completes mixing in a short machine so that the required input work is approximately equal to the heat required to warm the process material, thereby permitting high speed operation, as the process material is the coolant.

Another feature is to provide an improved apparatus which the restrictive ridge and the groove dividing means mechanically separate so as to be adjustable in clearance to the barrel bore.

Still another feature is to provide an improved apparatus the barrel grooves of which do not require the usual high surface finish of extruder grooves.

A further feature is to provide an improved apparatus which extrudes a pulseless extrusion.

A still further feature is to provide an improved apparatus costs less to buy, costs less to operate and produces a superior quality extrusion.

BRIEF DESCRIPTION OF THE DRAWINGS

FIG. 11 is a cross-sectional view of the barrel extrusion portion showing an alternate groove design.

FIG. 12 is a cross-sectional view of FIG. 11.

FIG. 13 is a surface development of the barrel grooves of FIG. 11.

FIG. 14 is a cross-sectional view of FIG. 13 showing the barrel receiving groove.

FIG. 15 is a cross-sectional view of FIG. 13 showing the barrel sending groove.

FIG. 16 is a sectional elevational view of an alternate barrel groove design.

FIG. 17 is a cross-sectional elevational view of the alternate barrel design, split on the center line to show the restriction of extrusion flow caused by rotor endwise movement.

FIG. 18 is an elevational view of the rotor adapted for the barrel of FIG. 16.

FIG. 19 is a cross-sectional view of the barrel extrusion portion showing an alternate design which provides a pocket to delay the flow of over size or cold material.

DESCRIPTION OF THE PREFERRED EMBODIMENT

Introduction

Figure 1:
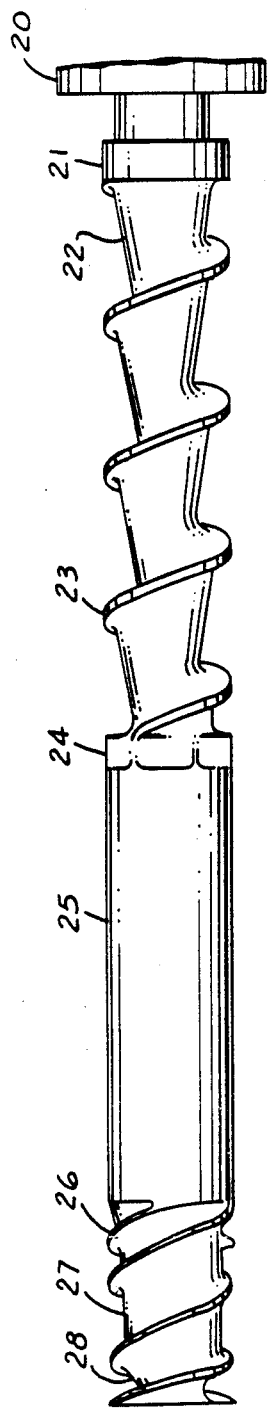
FIG. 1 is an elevational view of the extrusion apparatus rotor and is the preferred embodiment as applied to refining and extruding process material.

As an introduction to the present invention, there is provided a new or improved extrusion apparatus, of the rotor and barrel type, having a feed means, a pressurizing and deaerating section, a rotor to barrel material transfer, a barrel extrusion section, a barrel to rotor material transfer and an extrusion discharge section. The feed means consists of a feed hopper provided with a helically grooved rotor arranged to enter the feed material into the extruder. The pressurizing and deaerating section is short and due to the high viscosity of the entering material does not develop temperature stratification in the process material. The deaeration is accomplished by wide tooth tops operating in a smooth barrel bore as per my U.S. Pat. No. 3,888,304. The rotor to barrel material transfer zone is relatively short and has multiple cam-shaped rotor teeth communicating with cam-shaped barrel teeth in a manner which transfers all of the process material from the rotor to the barrel. The barrel extrusion grooves consists of, a longitudinal sending groove, a wide cam-shaped area and a longitudinal receiving groove. The longitudinal receiving groove receives the process material from the barrel grooves of the rotor to barrel transfer and distributes it along the length of the barrel extrusion section. The cam-shaped area, also the length of the barrel extrusion section, starts deep and diminishes in depth circumferentially downstream to a minimum restrictive depth at the receiving longitudinal groove. The receiving longitudinal groove transports the process material, downstream, the length of the barrel extrusion section to the barrel grooves of the barrel to rotor transfer zone. The barrel to rotor transfer zone communicates with helical rotor grooves which extrude the process material from the extruder.

DESCRIPTION OF THE EXTRUSION APPARATUS

Referring to the drawings like references numbers and letters donate the corresponding part throughout several views of the extrusion apparatus.

Figure 2:
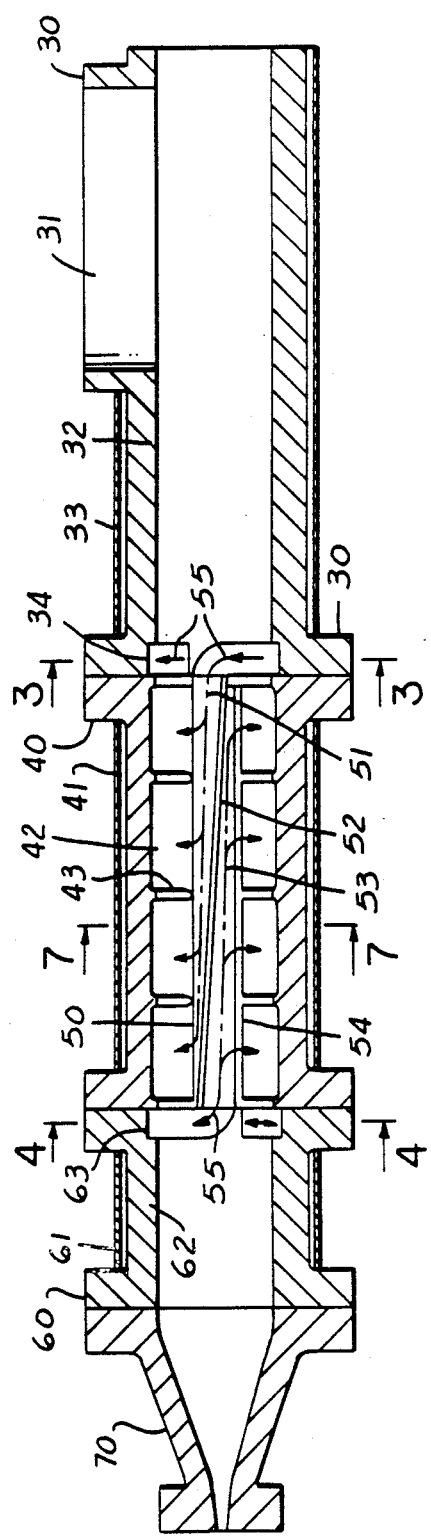
FIG. 2 is a sectional elevational view of the extrusion apparatus barrel and is the preferred embodiment as applied to refining and extruding process material.

The extrusion apparatus FIGS. 1 and 2 constructed in accordance with the invention is the preferred embodiment as applied to the continuous refining and extrusion of process material. FIGS. 1 and 2 combine to illustrate the extrusion apparatus. The process material is entered at the hopper 31 to rotor 21 which is provided with a helical extrusion groove or grooves 22, is rotatably mounted in barrel bore 32 and adapted for rotation by drive means 20. Rotation of rotor 21 enters the process material into the extruder barrel bore 32. Rotor 21 is provided with a wide tooth top design 23, which acts in conjunction with the barrel bore 32 to form a spiral passage for trapped air to return back to the hopper opening. The initial helical groove in a smooth barrel is relatively short to avoid temperature stratification, but is long enough to develop the extrusion pressure required for downstream processing. This extrusion section is followed by a rotor to barrel transfer zone consisting of a rotor with groove configuration 24 and a barrel with groove configuration 34 which coact with each other to transfer all of the process material from the rotor grooves 24 to the barrel grooves 34. The barrel grooves 34 communicate with the barrel extrusion section longitudinal sending grooves 51. Dashed lines 55 indicate the flow of process material. Longitudinal grooves or groove 51, distributes the process material along the length of the barrel extrusion section and communicates, along its trailing edge with the cam-shaped area 42. Cam-shaped area 42 starts deep along longitudinal groove 51 and is progressively reduced in depth circumferentially downstream to longitudinal groove 53. The exit end 54 of groove 42 has a clearance to rotor 25 which is restrictive to the process material. The process material flow across the cam-shaped area moves the warmed and worked material adjacent to the rotor rapidly downstream and out, thereby minimizing rework of already worked process material. Longitudinal grooves 51 and 53 are separated from each other by the divider 52, which has minimum clearance to the rotor 25. The divider 52 is shown as a separate piece so clearance to rotor 25 can be adjusted. Leaving the barrel extrusion section the process material flow 55 enters the barrel grooves 63 of the barrel to rotor transfer zone. The barrel grooves 63 direct the process material flow into the multiple start helical rotor grooves 26. The multiple helical rotor grooves 26 can have fewer starts 27 when leaving the barrel to rotor zone. Increased groove depth, at the end of the rotor 21, simulates a submerged nose cone and is designed to mechanically change extrusion flow to plug flow. Barrel temperature control means are shown as 33, 40 and 61 for barrel sections 30, 40 and 60. The extrusion port 70 can take many forms to suit production requirements.

Figure 3:
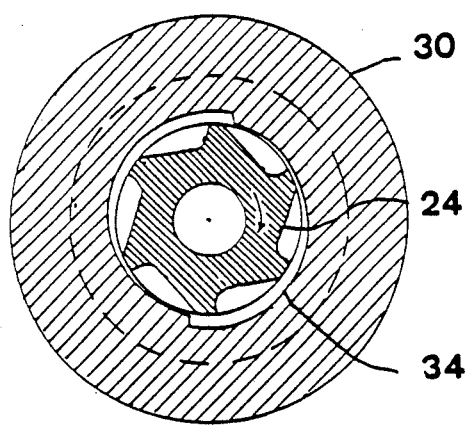
FIG. 3 is a cross-sectional view of the rotor to barrel transfer.

FIG. 3 is a cross-sectional view of the rotor to barrel transfer zone and is provided with multiple rotor cams 24 arranged to transfer the process material into the barrel receiving grooves 34.

Figure 4:
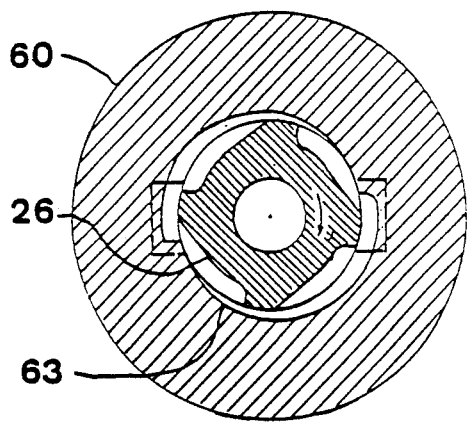
FIG. 4 is a cross-sectional view of the barrel to rotor transfer.

FIG. 4 is a cross-sectional view of the barrel to rotor transfer zone and is provided with dual cam-shaped barrel grooves 63 arranged to transfer the process material into rotor grooves 26.

Figure 5:
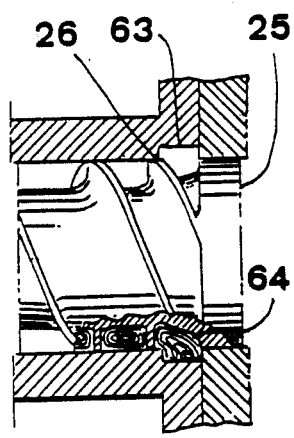
FIG. 5 is a cross-sectional view of the barrel to rotor transfer with the rotor in the open position.
Figure 6:
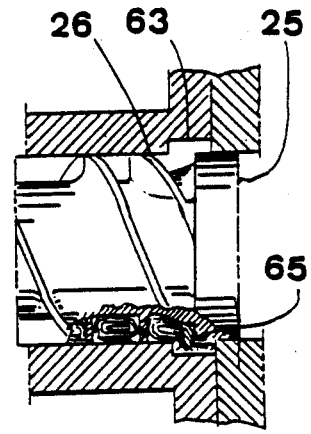
FIG. 6 is a cross-sectional view of the barrel to rotor transfer with the rotor moved endwise to constrict extrusion flow.

FIGS. 5 and 6 are cross-sectional views of the barrel to rotor transfer. Sectionalized portion of rotor 25, FIG. 5 shows the normal barrel to rotor process material flow 64. Sectionalized portion of rotor 25, FIG. 6 shows the restricted barrel to rotor flow 65 when rotor 25 is adjusted downstream.

Figure 7:
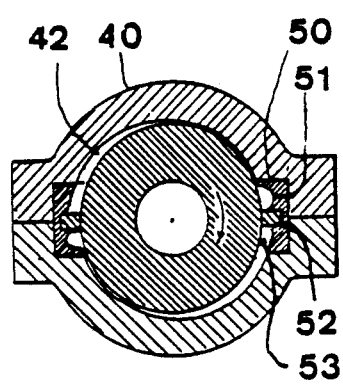
FIG. 7 is a cross-sectional view of the barrel extrusion portion of the extruder.

FIG. 7 is a cross-sectional view of the barrel extrusion section showing the relation of the longitudinal sending groove 53, the cam-shaped area 42, the longitudinal receiving groove 51 and the longitudinal groove divider 52.

Figures 8, 9:
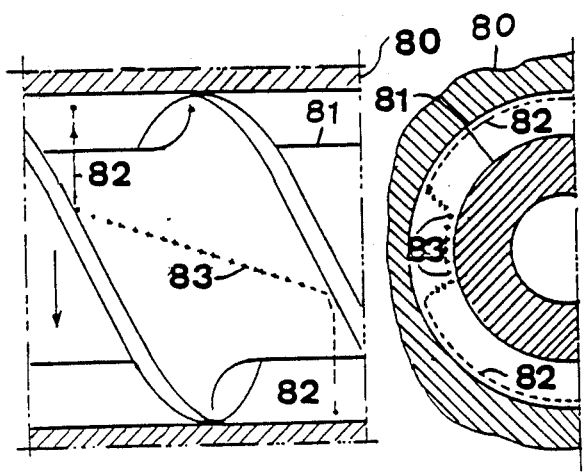
FIG. 8 is an elevational of a normal helical groove extruder showing the process material flow lines.
FIG. 9 is a cross-sectional view of FIG. 8.

FIG. 8 is a cross-sectional view of a typical helical rotor groove extruder. It shows, with a dashed line, the outer groove process material flow essentially circumferential from the leading edge of the groove to the trailing edge. The return flow, shown as a line of crosses, follows the path of least resistance, at the lower portion of the extruder groove, back from the trailing edge to the leading edge of the extruder groove. The circumferential flow elongates the process material as it crosses the extrusion groove. The elongated process material arriving at the trailing edge of the extruder groove has to push the previously arrived process material back across the groove and thereby shrinking the elongated process material, and thereby wasting the energy used to elongate it.

FIG. 9 is a cross-sectional view of FIG. 8 and shows the tension producing extruder action as a line of dashes 82 and the compression producing extruder action as a line of crosses.

Figure 10:
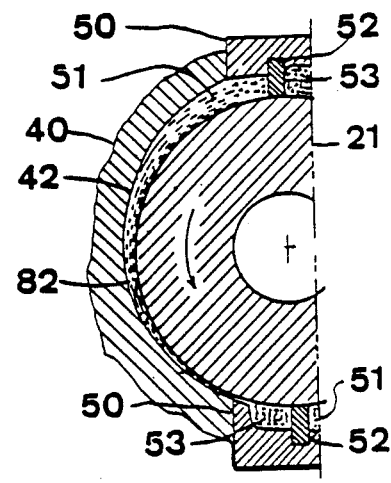
FIG. 10 is an enlarged cross-sectional view of the barrel extrusion portion showing the process material flow lines.

FIG. 10 is an enlarged cross-sectional view of the barrel extrusion section showing the progressive elongation of the process material 82 as a line of dashes. The geometry is such that the process material adjacent to the rotor, receives the most work and is moved across the area and out of the extruder as compared to the process material deeper in the barrel groove, thus minimizing the rework of already worked process material.

FIG. 11 is an alternate design of the cam-shaped area 42 of the barrel extrusion section 40. It consists of multiple circumferential grooves 44 and 45. Grooves 44 start deep at longitudinal groove 51 and progressively decrease in depth to their downstream end 54 at longitudinal groove 53. Groove 45 starts at minimum depth at longitudinal groove 51 and progressively increases to full depth at its end at longitudinal groove 53. The sides and end of groove 44 are formed by restrictive barriers over which the process material must flow to reach longitudinal groove 53. This zig zag arrangement for a greatly increased barrier length and therefore can be made more restrictive without throttling extruder capacity. The longitudinal divider 52 located for and aft of grooves 53 and 51 divides the various stages of barrel extrusion. As shown two stages of barrel extrusion are used, however, if required, by the process material, one, three or more stages can be used. The dashed lines 55 show the flow pattern of the process material through a barrel extrusion stage.

FIGS. 12 is a cross-sectional view of FIG. 11 and shows the depth relation of groove 44 to groove 45.

FIG. 13 is a surface development of barrel extrusion grooves 44 and 45 of FIG. 10. Barriers restricting flow from groove 44 are shown as 54. Process material flow lines are shown as 55.

FIG. 14 is a cross-sectional view of FIG. 13 and shows the decreasing depth of groove 44 terminating at 54.

FIG. 15 is a cross-sectional view of FIG. 13 and shows the increasing depth of groove 45.

FIG. 16 is an alternate design of the end section 60, which provides barrel grooved 64 and 65 to replace rotor grooves 26 and 27. The barrel grooves 64 and 65 coacting with a plain cylindrical rotor changes rotor extrusion to barrel extrusion and there by provides "blipless" extrusion. Multiple barrel grooves 66 extrude the process material to the extrusion port 70.

FIG. 17 is a split elevation cross-sectional view of the end section of the extruder. Process material flow 66 is the material flow with the rotor 29 in the open position 29A. Process material flow 67 is the material flow with rotor 29 in a throttling position 29B.

FIG. 18 is an elevational view of rotor 21 with cylindrical section 25 extended through section 60 as 29 so as to provide barrel extrusion.

FIG. 19 is an enlarged cross-sectional view of the barrel extrusion section showing the location of a pocket 47, arranged to delay the flow of oversize process material requiring extra work, or to trap oversize foreign material.

As the process material can vary and mixing requirements can be different the groove 47 can arrange to conform with the mixing problem. Multiple grooves 47 can be provided, pockets to provide dwell time and many of the existing static mixing aids can be added.

Figure 20:
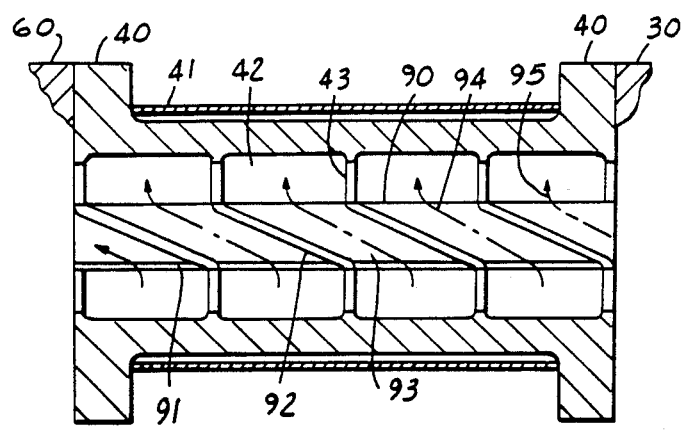
FIG. 20 is a cross-sectional view of the barrel extrusion portion showing the barrel extrusion grooves in series.

FIG. 20. As the process material will be of many varieties and processing requirements varied, the extruder must be adaptable. Therefore another alternate design is included. This design can be used in total or in part with extruder barrel section of FIGS. 2 and 10.

The FIG. 2 extrusion barrel 40, with cam-shaped area 42 and longitudinal bar 50, exposes all of the process material to a shear length of one and a half diameters and provides a restrictive barrier length of eight diameters.

The FIG. 11 extrusion barrel 40, with cam-shaped area consisting of multiple grooves 44 and 45 and longitudinal bar 50, exposes all of the process material to a shear length of one and a half diameters and provides a restrictive barrier length of 30 diameters.

The FIG. 20 extrusion barrel 40, with cam-shaped area 42 and longitudinal bar 90, exposes all of the process material to a shear length of six diameters and provides four successive barriers each one diameter in length.

FIG. 20 features a longitudinal dividing bar 90, installed in the barrel extrusion section 40. The leading edge of extruding bar 90 is provided with a restrictive barrier 91 the top of which is spaced from rotor 25 to permit only acceptable size process material to pass the barrier. The longitudinal bar 90 has diagonal ribs 92 which align with barrel ribs 43 and direct the process material flow one flight downstream.

Figure 21:
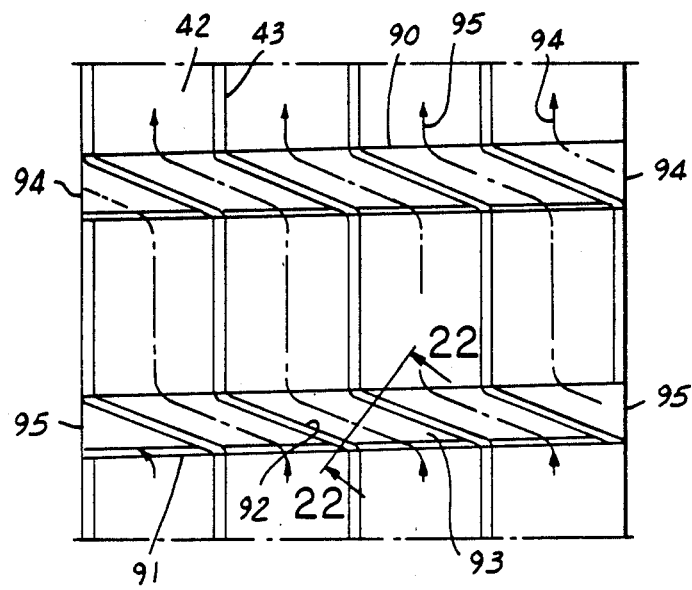
FIG. 21 is a 360° surface development of the barrel grooves of FIG. 20.

FIG. 21 is a complete surface development of the barrel bore of barrel extrusion section 40, complete with cam-shaped areas 42 and dividing ribs 43. The longitudinal bars 50 are replaced with longitudinal bars 90. The bars 90, at their leading edge are fitted with a restrictive barrier 91 the top of which is spaced from the rotor 25 so as to be restrictive to oversize process material. Aligning with barrel ribs 43 and installed on longitudinal bars 90 are diagonal ribs 92, extending to the barrel bore and arranged to advance the flow of process material one flight downstream. The direction of flow of the process material is shown, in dashed lines 94 and 95.

Figure 22:
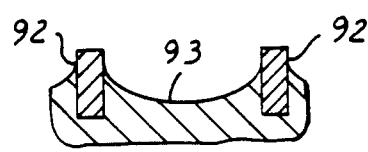
FIG. 22 is a cross-sectional view of the passages connecting the circumferential grooves in series.

FIG. 22 is a cross-sectional view of the longitudinal bar 90. It shows the installation of diagonal ribs 92 and shape of groove 93 as formed.

I claim:

1. An extrusion apparatus for the refining, mixing and extruding of thermoplastic and rubber like materials, for both hot or cold feed, which comprises:

an elongated generally cylindrical barrel member and an elongated rotor member disposed coaxially in the interior of said barrel member;

means provided for relative rotational movement between said rotor and barrel members in treating and axial advancing the material to be processed along said members;

said rotor and barrel members having a feed end and a discharge end, a pressurizing section, a rotor to barrel transfer zone, a barrel extrusion mixing section, a barrel to rotor transfer zone, and an end extrusion section interposed between said feed and discharge ends;

said pressurizing section being provided with helical rotor grooves coacting with a smooth barrel bore to pressurize and transport the process material to the rotor to barrel transfer zone;

said barrel within said extrusion mixing section being provided with a first longitudinally extending barrel groove;

said barrel to barrel transfer zone having a pair of barrel grooves which start shallow and increase in depth and in extrusion capacity;

said rotor within said rotor to barrel transfer zone being provided with multiple short longitudinal cam-shaped projections arranged to receive the said process material, from the said pressurizing section and forcing it radially outward into said pair of barrel grooves which increase in depth and extrusion capacity, in a circumferential downstream direction and at their downstream end are arranged to transfer the said process material to said longitudinally extending barrel groove extending the length of the barrel extrusion mixing section and having upstream and downstream ends;

said first longitudinally extending barrel groove terminating at the downstream end of the barrel extrusion mixing section in a wide cam-shaped area which starts deep and progressively decreases in depth in a circumferential downstream direction and which coacts with a smooth cylindrical rotor to move said process material in a circumferential direction;

the rotor action developing high local pressure in the process material and as the clearance between the cam-shaped area to rotor decreases, a high shear rate develops forming conditions ideal for the micro dispersion of chemicals into the polymer, and the flow of the said process material is such that the well worked process material is rapidly moved downstream in preference to the less worked process material deeper in the cam-shaped area;

whereby moving the said well worked process material rapidly forward, minimizes the rework of well worked process material and exposes the less worked material to extruder action;

said barrel extrusion mixing section having a second longitudinally extending groove;

the said process material, at the end of the cam-shaped area being intercepted by said second longitudinally extending groove, extending the length of the barrel extrusion mixing section and at its downstream end enters the barrel to rotor transfer zone, the barrel portion of which is provided with dual circumferential grooves, communicating with said second longitudinally extending groove of the barrel extrusion mixing section and directing the process material radially inward to multiple helical rotor grooves, arranged to receive said process material and transport it downstream;

design of said barrel to rotor transfer zone is such, that endwise movement of said rotor member in relation to the barrel member obstructs the barrel to rotor flow of the process material and thereby reduces extruder capacity;

the control of extruder capacity can be used to control the temperature of extrusion as approximately the same input work is applied to less process material.

2. An apparatus as claimed in claim 1, in which the multiple short longitudinal cam-shaped projections of the rotor are replaced with multiple angular or helical grooves.

3. An apparatus as claimed in claim 1, in which the barrel extrusion section's wide cam-shaped area is divided by circumferential ridges into sections, to accommodate flow adjustment by altering restrictive clearances at each section.

4. An apparatus as claimed in claim 3, in which the sections of said barrel extrusion section's wide cam-shaped area are connected in series so process material leaving one section is directed to the next downstream section.

5. An apparatus as claimed in claim 1, in which said barrel extrusion mixing section's wide cam-shaped area is provided with multiple circumferential grooves, starting deep at the leading first longitudinally extending groove, tapering in capacity to the downstream end and provided with barriers, on both sides and end, which have a restrictive clearance, barrier top to rotor outside diameter; adjacent and parallel to is a second set of multiple circumferential grooves, which start at minimum depth and increase in depth to their downstream end and second longitudinally extending groove.

6. An apparatus as claimed in claim 1, in which the barrel to rotor transfer at the end of the barrel to rotor transfer section is eliminated, helical barrel grooves accept the process material from the barrel extrusion section and extrude it, coacting with a smooth cylindrical rotor near the discharge end where multiple short grooves are spaced circumferentially around the barrel bore.

7. An apparatus for the refining and extrusion of thermoplastic and rubber like material having a rotor rotatably mounted in the cylindrical bore of a barrel and operable to move said material from one end of said barrel to the other, to progressively change said material to a warmed fluent phase, to refine agglomerates, for the extrusion from an extrusion port at the discharge end of said barrel comprising:

first means structurally integral with said rotor and barrel for operably exerting continuous pressure, warming and transporting said material;

second means structurally integral with said rotor and barrel, reviewing the material from said first means, and including a barrel extrusion section having barrel grooves, said barrel extrusion section for continuously intensely compressing and shearing the said material, refining and separating the well worked material adjacent to said rotor from less worked material, deeper in said barrel grooves and transporting said refined material downstream and thereby effecting the fast forward flow of the fluent phase material, minimizing the rework of already worked material and exposing the less worked material to the surface of said rotor;

fourth means structurally integral with said rotor and barrel, reviewing the material from said third means, and including a barrel to rotor transfer zone for the continuous transfer of said material from said barrel to said rotor; and fifth means structurally integral with said rotor and barrel, operable to receive said material from said barrel to rotor transfer zone of the fourth means and operable to transport said material to said extrusion port.

* * * * *